United States Patent [19]
Taniji

[11] Patent Number: 5,883,667
[45] Date of Patent: Mar. 16, 1999

[54] SOLID-STATE IMAGE PICK-UP DEVICE ELIMINATING SMEAR IMAGE COMPONENT FROM VIDEO SIGNAL THROUGH REAL TIME CONTROL

[75] Inventor: Yukio Taniji, Tokyo, Japan

[73] Assignee: NEC Corporation, Tokyo, Japan

[21] Appl. No.: 613,884

[22] Filed: Mar. 11, 1996

[30] Foreign Application Priority Data

Mar. 10, 1995 [JP] Japan .................................. 7-079849

[51] Int. Cl.⁶ .................................................. H04N 5/335
[52] U.S. Cl. ........................................ 348/248; 348/241
[58] Field of Search ................................... 348/241, 248, 348/249, 250, 231, 232, 682, 683; H04N 5/335

[56] References Cited

U.S. PATENT DOCUMENTS

| | | | |
|---|---|---|---|
| 4,567,524 | 1/1986 | Levine | 348/249 |
| 4,689,687 | 8/1987 | Koike et al. | 348/248 |
| 4,731,656 | 3/1988 | Dischert et al. | 348/249 |
| 5,025,319 | 6/1991 | Mutoh et al. | 348/248 |
| 5,528,291 | 6/1996 | Oda | 348/220 |

OTHER PUBLICATIONS

N. Mitani et al., "Suppression of the blooming and of the vertical smear on the CG–FT–CCD Imager", TEBS 94–5, ED 774, Feb. 24, 1984, pp. 25–30.

Primary Examiner—Andrew I. Faile
Assistant Examiner—Tuan V. Ho
Attorney, Agent, or Firm—Sughrue, Mion, Zinn, Macpeak & Seas, PLLC

[57] ABSTRACT

A solid-state image pick-up device has photo-diodes each connectable to every second transfer stage of vertical shift registers, and the other stages store false image signal components respectively contained in the electric charge packets; a smear image eliminating circuit subtracts the value of the false image signal component from the value of the associated electric charge packet so as to elimiante the smear image from the optical image represented by the electric charge packets.

8 Claims, 7 Drawing Sheets

SOLID-STATE IMAGE PICK-UP DEVICE ELIMINATING SMEAR IMAGE COMPONENT FROM VIDEO SIGNAL THROUGH REAL TIME CONTROL

FIELD OF THE INVENTION

This invention relates to a solid-state image pick-up device and, more particularly, to a solid-state image pick-up device eliminating smear image component from a video signal through a real time control.

DESCRIPTION OF THE RELATED ART

A typical example of the solid state image pick-up device contains a charge-coupled device, which is abbreviated as "CCD". One of the problems inherent in the charge-coupled device is called as smear.

When light is incident on an interline type charge-coupled device, the photo diodes generates electric charge packets representative of an optical image, and the electric charge packets are transferred through a vertical shift register as a video signal. The video signal forms an image on a screen of a display unit.

However, if the light is strong, the amount of electric charge packet is too large to store the photo diode. The excess electric charge does not represent a part of the optical image, and flows into the semiconductor substrate. Part of the excess electric charge is diffused into the, vertical shift register. The strong light may repeat the reflection between the boundary of the semiconductor substrate and the photoshield plate so as to enter into the vertical shift register. The vertical shift register directly converts the incident light to electric charge, and the electric charge also does not represent a part of the optical image.

The electric charge serves as a false image signal, and is transferred through the vertical shift register together with the video signal. The false image signal forms a vertical smear image around the image corresponding to the strong optical image on the screen.

A frame interline type charge-coupled device has been proposed so as to improve the vertical smear image. In general, the intensity of the vertical smear image is proportional to the time for transferring the false image signal. The frame interline type charge-coupled device includes a field memory between the vertical shift register and the horizontal shift register. When the video signal is read out from the photo-electric converting section to the vertical shift register, the video signal is transferred through the field memory at high speed during a vertical blanking period, and suppresses the vertical smear image.

Another approach against the vertical smear image is to provide a vertical smear suppressing circuit disclosed in "Suppression of the blooming and of the vertical smear on the CG-FT-CCD Imager", Technical Report of Television Society, TEBS 94-5, ED 774, pages 25 to 30. While the vertical shift register transfers the charge packets, the charge packet contains the false image signal component. However, the false image signal component is separated from the charge packet in the vertical blanking period. A vertical smear suppressing circuit is incorporated in an interline type charge-coupled device, and subtracts the false image signal component from the video signal containing it upon output from a line memory.

The two anti-smear technologies encounter problems as follows. The field memory is indispensable to the frame interline type charge-coupled device, and occupies a large amount of real estate. This results in a low production yield and a high production cost. Moreover, while the field memory is transferring the video signal at high speed, the frame interline type charge-coupled device generates a large amount of heat, and a designer takes a heat radiation system into account. Finally, frame interline type charge-coupled device can not perfectly extinguish the vertical smear image.

Figure 1:
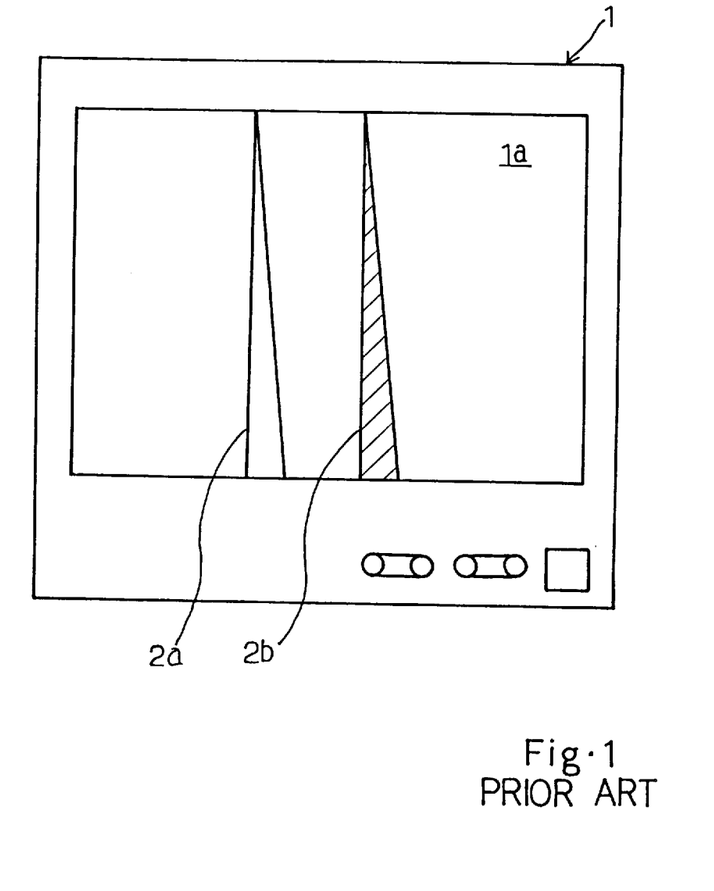
FIG. 1 is a front view showing the vertical smear image on the screen generated from the image carrying signal of the prior art interline type charge-coupled device associated with the external correction circuit.

On the other hand, when a light source is moved, the vertical smear suppressing circuit is not effective against the vertical smear image. This is because of the fact that the vertical smear suppressing circuit eliminates the false image signal component in a field from the video signal in the next field. Although the vertical smear suppressing circuit exactly eliminates the false image signal component during the movement of the image of the light source in an upper section of the screen 1a of a display unit 1, the false image signal component is imperfectly removed from the video signal depending upon the moving velocity of the light source during a movement in a lower section of the screen 1a, and the display unit 1 produces a vertical image 2a in white and another vertical image 2b in black on the screen 1a from the video signal as shown in FIG. 1.

SUMMARY OF THE INVENTION

It is therefore an important object of the present invention to provide a solid-state image pick-up device which exactly eliminates a false image signal component from a video signal regardless of the motion of a light source.

To accomplish the object, the present invention proposes to eliminate a false image signal component from a video signal in a real time manner.

In accordance with one aspect of the present invention, there is provided a solid-state image pick-up device comprising: a plurality of photo-electric converting elements for converting an optical radiation representative of an optical image to a plurality of electric charge packets; a charge packet transferring means including a plurality of stages connectable to the plurality of photo-electric converting elements, and responsive to a first control signal so as to store the plurality of electric charge packets in first stages selected from the plurality of stages at intervals, false image signal components representative of a smear image being stored in second stages of the plurality of stages when the optical image partially stronger in intensity than the other part causes at least the plurality of photo-electric converting elements to produce not only the charge packets but also the false image signal components, the charge packet transferring means being further responsive to a second control signal so as to transfer the charge packets and the false image signal components from stage to stage toward an output node thereof; and a smear image eliminating circuit coupled to the output node of the charge packet transferring means, and including a first memory for storing first electric signals respectively representative of the plurality of charge packets, a second memory for storing second electric signals respectively representative of the false image signal components, the first memory and the second memory being responsive to a third control signal so as to synchronously output each first electric signal and each second electric signal from respective output nodes thereof, and a subtracter having a first input node connected to the output node of the first memory, a second input node connected to the output node of the second memory and an output node for outputting a video signal representing the optical image without the smear image.

In accordance with another aspect of the present invention, there is provided a solid-state image pick-up device comprising: a plurality of photo-electric converting elements for converting an optical radiation representative of an optical image to a plurality of electric charge packets; a charge packet transferring means including a plurality of stages connectable to the plurality of photo-electric converting elements, and responsive to a first control signal so as to store the plurality of electric charge packets in first stages selected from the plurality of stages at intervals, false image signal components representative of a smear image being stored in second stages of the plurality of stages when the optical image partially stronger in intensity than the other part causes at least the plurality of photo-electric converting elements to produce not only the charge packets but also the false image signal components, the charge packet transferring means being further responsive to a second control signal so as to transfer the charge packets and the false image signal components in parallel to a first output node and a second output node, respectively; and a smear image eliminating circuit coupled to the output node of the charge packet transferring means, and including a subtracter having a first input node connected to the first output node of the charge packet transferring means, a second input node connected to the second output node of the charge packet transferring means and an output node for outputting a video signal representing the optical image without the smear image.

BRIEF DESCRIPTION OF THE DRAWINGS

The features and advantages of the image pick-up device according to the present invention will be more clearly understood from the following description taken in conjunction with the accompanying drawings in which.

DESCRIPTION OF THE PREFERRED EMBODIMENTS

First Embodiment

Figure 2:
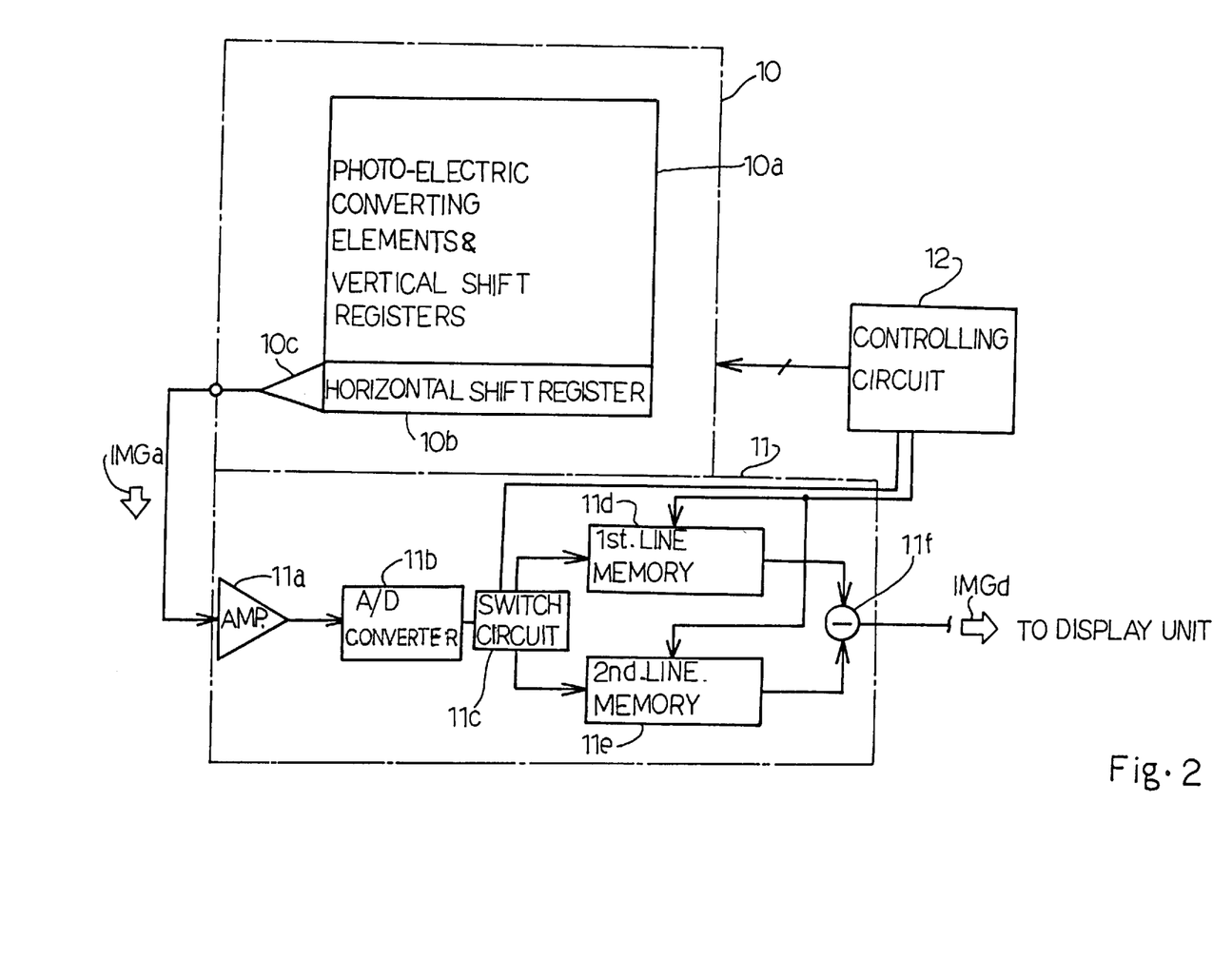
FIG. 2 is a block diagram showing a solid-state image pick up device according to the present invention.

Referring first to FIG. 2 of the drawings, a solid-state image pick-up device embodying the present invention largely comprises a charge-coupled device 10, a smear image eliminating circuit 11 and a controlling circuit 12. The charge-coupled device 10 is of a progressive type, and converts an optical radiation carrying an optical image to an analog video signal IMGa. The analog video signal IMGa is representative of the optical image. However, when a bright source forms a part of the optical image, electric charge overflows, and mixes a false image signal component into the analog video signal IMGa. The false image signal component is causative of a vertical smear image on a screen.

The charge coupled device supplies the analog video signal IMGa to the smear image eliminating circuit 11. The smear image eliminating circuit 11 eliminates the false image signal component from the analog video signal IMGa, and produces a digital video signal IMGd. The digital video signal IMGd may be supplied to a display unit (not shown) so as to reproduce the optical image on the screen.

The controlling circuit 12 produces first control signals such as, for example, a vertical transferring signal, a horizontal transferring signal and a read-out pulse signal and second control signals. The first control signals are supplied to the charge-coupled device 10, and the second control signals are supplied to the smear image eliminating circuit 11.

The progressive type charge-coupled device 10 includes photo-electric converting elements and associated vertical shift registers 10a, a horizontal shift register 10b and an output circuit 10c, and each photo-electric converting element is accompanied with one stage of each vertical shift register. In the following description, the photo-electric converting elements and each vertical shift register are labeled with 10aa and 10ab, respectively.

The photo-electric converting elements 10aa are arranged in rows and columns, and the vertical shift registers 10ab are respectively associated with the columns of photo-electric converting elements. A photo-diode 10d may serve as each of the photo-electric converting elements 10aa.

Figure 3:
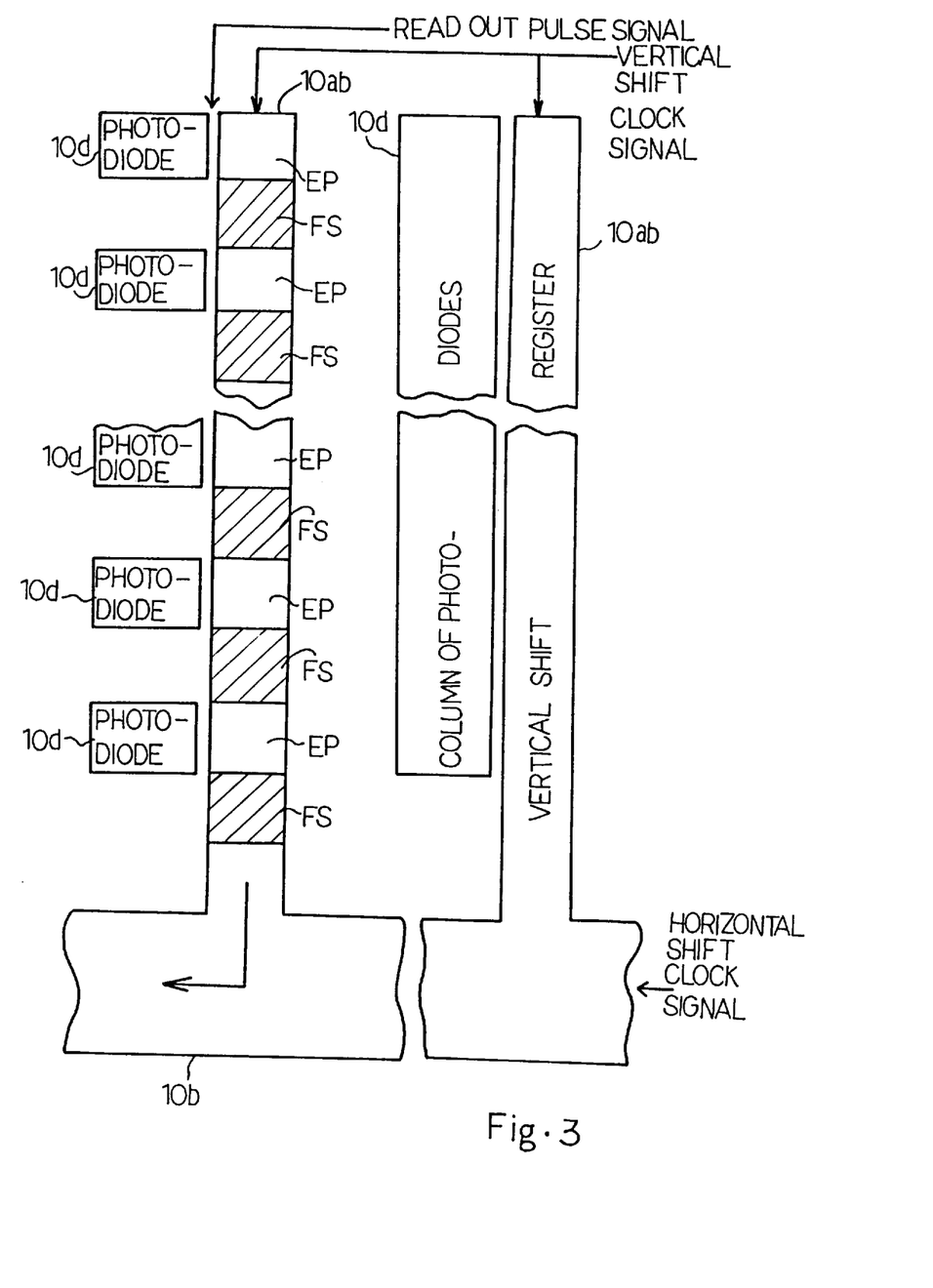
FIG. 3 is a schematic plan view showing the layout of a photo-diode array and vertical shift registers incorporated in the solid-state image pick-up device.

Each of the vertical shift registers 10ab has (i×n) transfer stages where n is the number of the photo-diodes 10d of each column and i is an integer equal to or greater than 2. The charge packets EP are stored in the associated vertical shift register 10ab at intervals, and at least every ith stage is empty. In this instance, i is two. Therefore, the electric charge packet EP is supplied from one of the photo-diode to every odd stage, and every even stage is empty as shown in FIG. 3.

When excess electric charge due to a bright spot flows into the vertical shift registers, the electric charge packets EP contain the false image signal components, and are respectively stored at the odd stages. On the other hand, the even stages only store the false image signal components FS, respectively. Thus, the electric charge packets and the false image signal components are alternately stored in each of the vertical shift registers 10ab. In this instance, the odd stages are first stages, and even stages are second stages.

Though not shown in the drawings, read-out gates are provided between the vertical shift registers 10ab and the columns of photo-electric converting elements 10aa, and the read-out pulse signal allows the columns of photo-electric converting elements 10aa to supply electric charge packets to the vertical shift registers 10ab.

The vertical transfer clock signal is supplied to the vertical shift registers 10ab, and the frequency of the vertical shift clock signal is twice as large as a vertical shift clock signal for an n-stage vertical shift register associated with n photo-diodes of each column.

The horizontal shift register 10b is connected to the vertical shift registers 10ab, and the charge packets are transferred from the vertical shift registers 10ab to the horizontal shift register 10b. The horizontal shift register 10b is responsive to the horizontal shift clock signal so as to transfer the charge packets to the output circuit 10c. The horizontal shift clock signal is twice as large as a horizontal shift clock signal for a horizontal shift register connected to the n-stage vertical shift registers.

The output circuit 10c includes a floating diffusion region coupled to the horizontal shift register 10b, and changes the electric charge packets to the analog video signal IMGa.

The smear image eliminating circuit 11 includes a buffer amplifier 11a coupled to the output circuit 10c, an analog-to-digital converter 11b coupled to the buffer amplifier 11a, a switch circuit 1c coupled to the analog-to-digital converter 11b, a first line memory 11d coupled to the switch circuit 11c, a second line memory 11e also coupled to the switch circuit 11c and a subtracter 11f coupled to the first and second line memories 11d and 11e.

The buffer amplifier 11a amplifies the analog video signal IMGa, and supplies the amplified analog video signal to the analog-do-digital converter 11b. The analog-to-digital converter 11b converts the analog video signal IMGa to a series of digital pre-treated signals. The digital pre-treated signals are supplied to the switch circuit 11c, and the switch circuit 11c is responsive to one of the second control signals so as to selectively supply the digital pre-treated signals to the first line memory 11d and the second line memory 11e. The digital pre-treated signals each representative of the electric charge packet EP and the digital pre-treated signals each representative of the false image signal component FS are stored in the first line memory 11d and the second line memory 11e, respectively.

The first line memory 11d and the second line memory 11e are responsive to another second control signal, and synchronously supply the digital pre-treated signal representative of the charge packet EP and the digital pre-treated signal representative of the false image signal component FS to the subtracter 11f. The subtracter 11f subtracts the value of the digital pretreated signal supplied from the second line memory 11e from the value of the digital pre-treated signal supplied from the first line memory 11d. Thus, the subtracter 11f eliminates the false image signal component FS from the charge packet EP, and generates the digital video signal IMGd representative of the optical image without a smear image.

Figure 4:
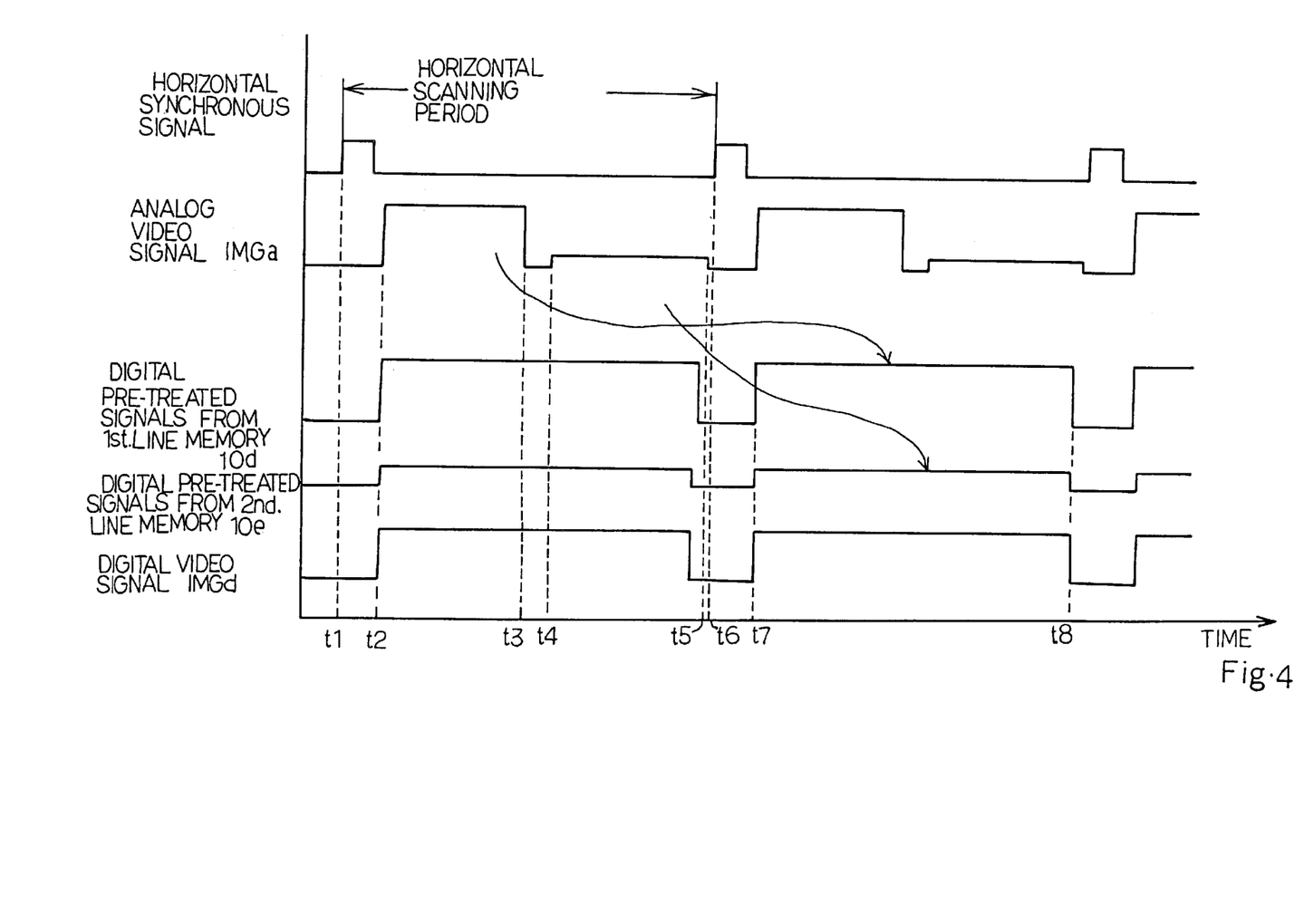
FIG. 4 is a timing chart showing a function of a smear image eliminating circuit incorporated in the solid-state image pick-up device.

FIG. 4 illustrates a function of the smear image eliminating circuit 11. Assuming now that a horizontal synchronous signal rises at time t1, the vertical shift registers 10ab supplies the charge packets EP to the horizontal shift register 10b, and the electric charge packets EP is changed to the analog video signal IMGa between time t2 and time t3. The analog video signal IMGa is converted to the digital pre-treated signals, and the digital pre-treated signals are stored in the first line memory 11d.

The vertical shift registers 11ab supply the false image signal components FS to the horizontal shift register 10c at time t4, and the false image signal components FS are changed to the analog video signal IMGa between time t4 and time t5. The analog video signal IMGa is converted to the digital pre-treated signals, and the digital pre-treated signals are stored in the second line memory 11e.

The horizontal synchronous signal rises at time t6 again, and times t1 and t6 defines a horizontal scanning period for a single sweep line on a screen.

The controlling circuit 12 starts to supply the second control signal to the first and second line memories 11d and 1e at time t7, and the first and second line memories 11d and 11e synchronously supply the digital pre-treated signal representative of one of the electric charge packets EP and the digital pre-treated signal representative of the associated false image signal component to the subtracter 11f, and the subtracter 11f generates the digital video signal IMGd. The subtracter 11f repeats the calculation on the digital pre-treated signals between time t7 and time t8, and a series of digital video signals IMGd represent a part of the optical image reproduced on one horizontal pixel lines on the screen.

As will be appreciated from the foregoing description, the electric charge packet EP and the false image signal component contained therein are stored in adjacent two stages of the vertical shift register 10ab, and the subtracter 11f eliminates the false image signal component from the charge packet. Even if the bright spot is moving at high speed, the false signal component stored in one of the stages is exactly corresponding to the false image signal component contained in the electric charge packet EP, and no smear image takes place on the screen.

Second Embodiment

Figure 5:
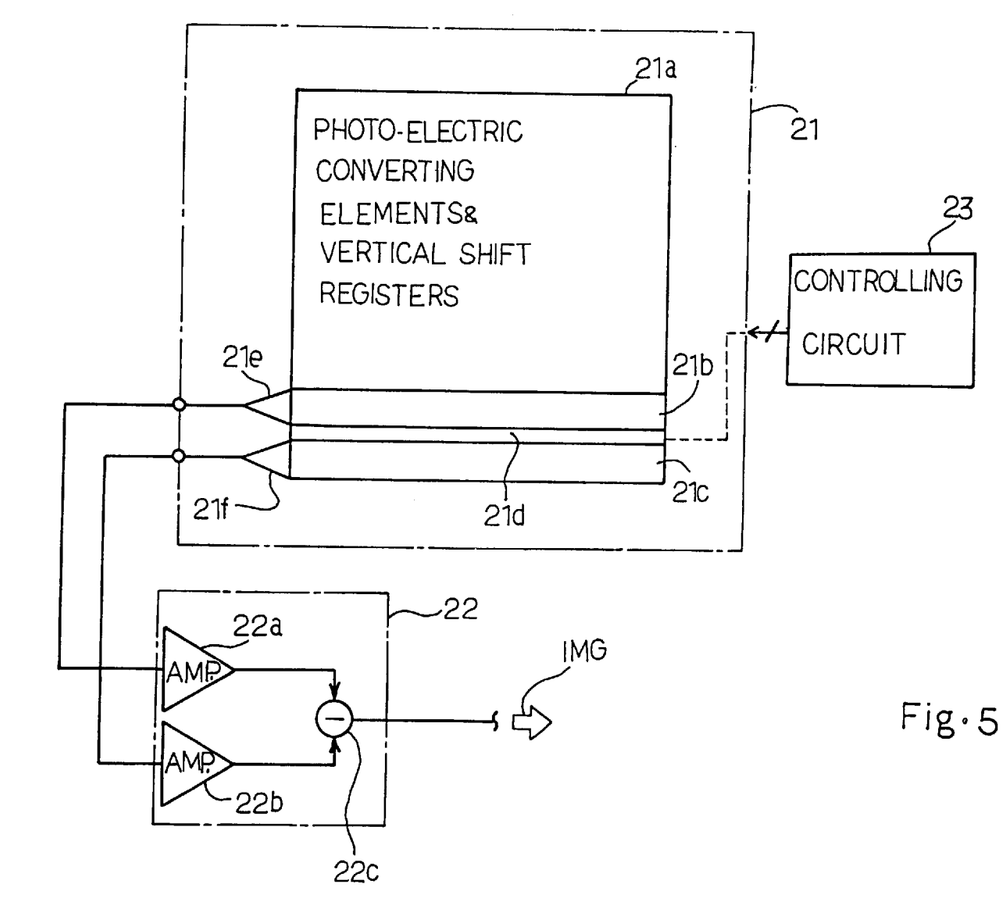
FIG. 5 is a block diagram showing another solid-state image pick up device according to the present invention.

Turning to FIG. 5 of the drawings, another solid-state image pick-up device embodying the present invention also largely comprises a charge-coupled device 21, a smear image eliminating circuit 22 and a controlling circuit 23. The charge-coupled device 21 includes photo-electric converting elements and vertical shift registers 21a, two horizontal shift registers 21b and 21c coupled through a switch circuit 21d to the vertical shift registers and two output circuits 21e and 21f.

The photo-electric converting elements are arranged in rows and columns, and the columns of photo-electric converting elements are respectively associated with the vertical shift registers. Each of the vertical shift registers has a plurality of stages twice as many as the photo-electric converting elements in each column. The switch circuit 21d is responsive to a first control signal so as to alternately supply the electric charge packet and the associated false image signal component to the horizontal shift registers 21b and 21c. For this reason, the output circuit 21e produces an analog video signal representative of an optical image from the electric charge packets, and the other output circuit 21e produces an analog video signal representative of a smear image.

The smear image eliminating circuit 22 includes two buffer amplifier circuits 22a and 22b respectively coupled to the output circuits 21e and 21f and a subtracter 22c coupled to the buffer amplifiers 22a and 22b. The subtracter 22c subtracts the value of the analog video signal representative of the smear image from the analog video signal representative of the optical image, and produces an analog video signal representative of the optical image without the smear image.

The solid-state image pick-up device shown in FIG. 5 achieves all the advantages of the first embodiment. Moreover, the solid-state image pick-up device implementing the second embodiment is simpler than the first embodiment.

Third Embodiment

Figure 6:
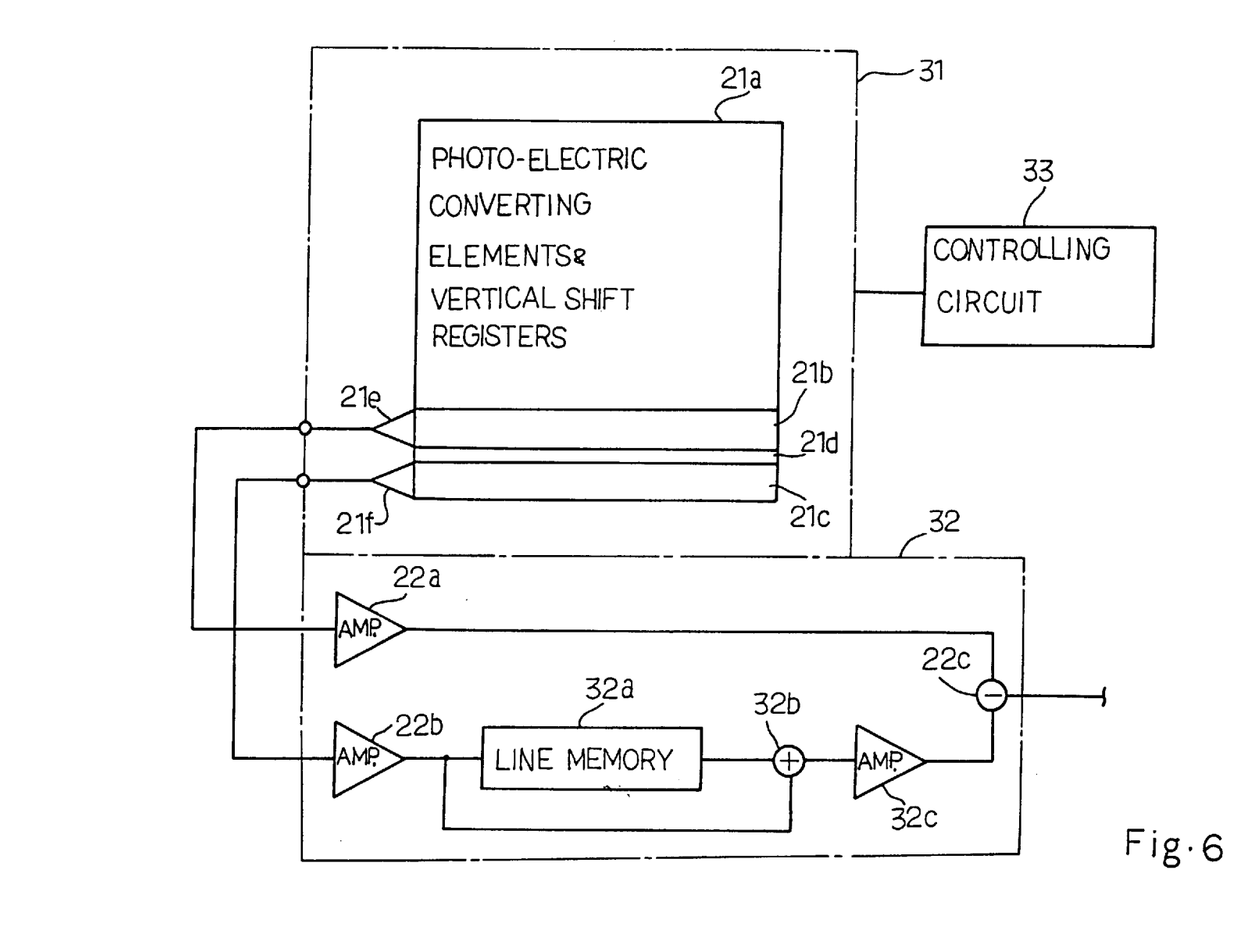
FIG. 6 is a block diagram showing yet another solid-state image pick up device according to the present invention.

Turning to FIG. 6 of the drawings, yet another solid-state image pick-up device embodying the present invention largely comprises a charge-coupled device 31, a smear image eliminating circuit 32 and a controlling circuit 33. The charge-coupled device 31 is similar to the charge-coupled device 21, and components are labeled with the same references as those of the second embodiment.

The smear image eliminating circuit 32 contains the buffer amplifiers 22a and 22b and the subtracter 22c. A line memory 32a, an adder 32b and a ½ gain amplifier 32c are further incorporated in the smear image eliminating circuit 32. The false image signal components are stored in the line memory 32a, and the adder 32b and the amplifier 32c calculate an average of the false image components on the two rows of photo-electric converting elements. The smear image eliminating circuit 32 can eliminate a relative error of ½ line.

Fourth Embodiment

Figure 7:
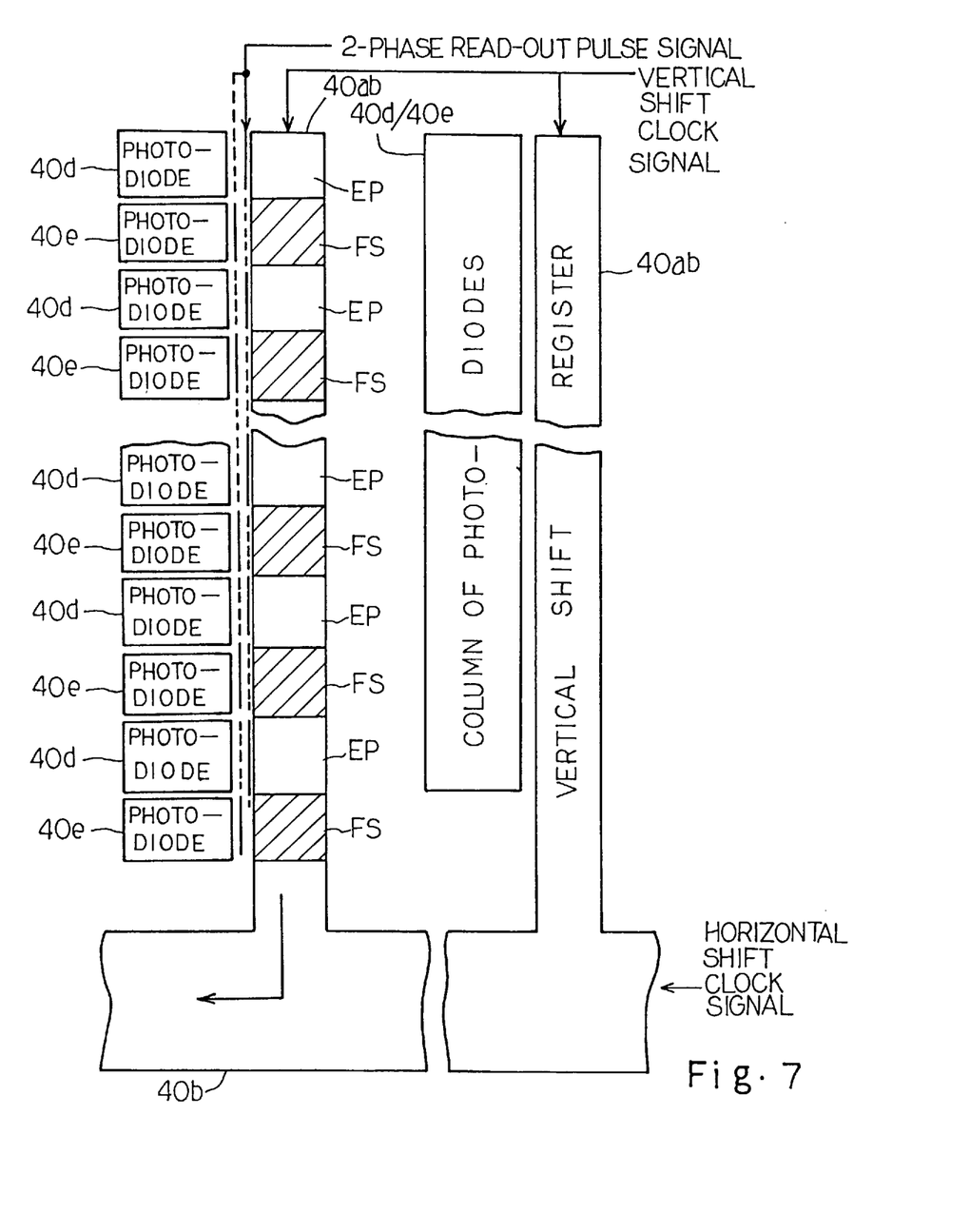
FIG. 7 is a schematic plan view showing the layout of a photo-diode array and vertical shift registers incorporated in still another solid-state image pick-up device.

FIG. 7 illustrates still another solid-state image pick-up device embodying the present invention. The solid-state image pick-up device implementing the fourth embodiment is similar to the first embodiment except for the relation between a column of photo-diodes 40d/40e and a vertical shift-register 40ab. Otherwise, the arrangement is similar to the first embodiment, and description is focused on the difference from the first embodiment.

The number of the photo-diodes 40d/40e in each column is equal to the transfer stages of each vertical shift register 40ab. First read-out electrodes are provided between the photo-diodes 40d and the associated vertical shift register 40ab, and second read-out electrodes are provided between the photo-diodes 40e and the associated vertical shift register 40ab. A two-phase read-out pulse signal alternately conducts the photo-diodes 40d and the photo-diodes 40e to the vertical shift register 40ab.

In detail, when the two-phase read-out pulse signal allows the first read-out electrodes to transfer the charge packets EP from the photo-diodes 40d to every other transfer stages, the false image signal components FS are accumulated in the other transfer stage as shown in FIG. 7, and the charge packets EP and the false image signal components FS are sequentially transferred to the horizontal shift register 40b.

Subsequently, the two-phase read-out pulse signal allows the second read-out electrodes to transfer the change packets EP from the photo-diodes 40e to the vertical shift register, and the false image signal components are accumulated to the transfer stages associated to the photo-diodes 40d. The charge packets EP and the false image signal components FS are sequentially transferred to the horizontal shift register 40b.

Thus, the every other transfer stages and the other transfer stages are alternately supplied with the charge packets EP from the photo-diodes 40d and 40e, and the horizontal shift register 40b supplies the charge packets EP and the false image signal components FS to a smear image eliminating circuit (not shown) similar to that of the first embodiment.

Although particular embodiments of the present invention have been shown and described, it will be obvious to those skilled in the art that various changes and modifications may be made without departing from the spirit and scope of the present invention.

For example, photo-electric converting elements may be arranged into a single line.

What is claimed is:

1. A solid-state image pick-up device, comprising:
   a plurality of photo-electric converting elements for converting an optical radiation representative of an optical image to a plurality of electric charge packets;
   a charge packet transferring means including a plurality of stages connectable to said plurality of photoelectric converting elements, and responsive to a first control signal so as to directly store said plurality of electric charge packets from said plurality of photo-electric converting elements into first stages selected from said plurality of stages at intervals, false image signal components representative of a smear image being stored in second stages of said plurality of stages when said optical radiation exceeds a maximum optical radiation that can be represented by an electric charge packet, thereby causing at least some of said plurality of photo-electric converting elements to produce not only said electric charge packets but also said false image signal components, wherein said first and second stages are arranged in columns such that, in each of said columns, every ith stage disposed along a direction of the column serves as one of said second stages when said plurality of electric charge packets is stored in said first stages, where i is an integer greater than 1, said charge packet transferring means being further responsive to a second control signal so as to transfer said electric charge packets and said false image signal components from stage to stage toward an output node thereof; and
   a smear image eliminating circuit coupled to said output node of said charge packet transferring means, and including
   a first memory for storing first electric signals respectively representative of said plurality of electric charge packets,
   a second memory for storing second electric signals respectively representative of said false image signal components, said first memory and said second memory being responsive to a third control signal so as to synchronously output each first electric signal and each second electric signal from respective output nodes thereof,
   a subtracter having a first input node connected to the output node of said first memory, a second input node connected to the output node of said second memory and an output node for outputting a video signal representing said optical image without said smear image,
   said photo-electric converting elements are arranged in rows and columns, and said plurality of stages form said columns which are a plurality of vertical shift registers each having transfer stages and form a horizontal shift register connected to said plurality of vertical shift registers,
   said transfer stages alternately serving as said first stages and said second stages,
   said smear image eliminating circuit further including:
      a buffer amplifier circuit connected between said output node of said charge packet transferring means, an analog-to-digital converter coupled to an output node of said buffer amplifier, and a switch circuit coupled between said analog-to-digital converter and said first and second memories so as to selectively connect said analog-to-digital converter to said first memory and said second memory.

2. The solid-state image pick-up as set forth in claim 1, wherein said photo-electric converting elements are directly coupled to said first stages via read-out gates.

3. The solid-state image pick-up as set forth in claim 2, wherein said electric charge packets are transferred between said charge packet transfer means and said smear image eliminating circuit without use of an intervening memory.

4. The solid-state image pick-up as set forth in claim 1, wherein said photo-electric converting elements are directly coupled to said vertical shift registers via read-out gates, and said vertical shift registers are directly coupled to said horizontal shift register without any intervening memory.

5. A solid-state image pick-up device, comprising:
   a plurality of photo-electric converting elements for converting an optical radiation representative of an optical image to a plurality of electric charge packets;
   a charge packet transferring means including a plurality of stages connectable to said plurality of photoelectric converting elements, and responsive to a first control signal so as to directly store said plurality of electric charge packets from said plurality of photo-electric converting elements into first stages selected from said plurality of stages at intervals, false image signal components representative of a smear image being stored in second stages of said plurality of stages when said optical radiation exceeds a maximum optical radiation that can be represented by an electric charge packet, thereby causing at least some of said plurality of photo-electric converting elements to produce not only said electric charge packets but also said false image signal components, wherein said first and second stages are arranged in columns such that, in each of said columns, every ith stage disposed along a direction of the column serves as one of said second stages when said plurality of electric charge packets is stored in said first stages, where i is an integer greater than 1, said charge packet transferring means being further responsive to a second control signal so as to transfer said electric charge packets and said false image signal components in parallel to a first output node and a second output node, respectively; and a smear image eliminating circuit coupled to said output nodes of said charge packet transferring means, and including a subtracter having a first input node connected to said first output node of said charge packet transferring means, a second input node connected to the second output node of said charge packet transferring means and an output node for outputting a video signal representing said optical image without said smear image, said photo-electric converting elements are arranged in rows and columns, and said plurality of stages form said columns which are a plurality of vertical shift registers each having transfer stages and form a horizontal shift register connected to said plurality of vertical shift registers, said transfer stages alternately serving as said first stages and said second stages, said smear image eliminating circuit further including a first buffer amplifier circuit connected between said first output node of said charge packet transferring means and said first input node of said subtracter, and a second buffer amplifier circuit connected between said second output node of said charge packet transferring means and said second input node of said subtracter, said smear image eliminating circuit further includes a line memory having an input node connected to an output node of said second buffer amplifier circuit, an adder having a first input node coupled to an output node of said line memory and a second input node connected to said output node of said second buffer amplifier circuit, and a ½ gain amplifier circuit having an input node connected to an output node of said adder and an output node connected to said second input node of said subtracter.

6. The solid-state image pick-up as set forth in claim 5, wherein said photo-electric converting elements are directly coupled to said first stages via read-out gates.

7. The solid-state image pick-up as set forth in claim 6, wherein said electric charge packets are transferred between said charge packet transfer means and said smear image eliminating circuit without use of an intervening memory.

8. The solid-state image pick-up as set forth in claim 5, wherein said photo-electric converting elements are directly coupled to said vertical shift registers via read-out gates, and said vertical shift registers are directly coupled to said horizontal shift register without any intervening memory.

* * * * *